United States Patent
Murakami

(10) Patent No.: US 8,460,155 B2
(45) Date of Patent: Jun. 11, 2013

(54) CONTROL APPARATUS FOR TWIN-CLUTCH AUTOMATIC TRANSMISSION

(75) Inventor: Minoru Murakami, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 0 days.

(21) Appl. No.: 13/469,194

(22) Filed: May 11, 2012

(65) Prior Publication Data

US 2012/0302399 A1    Nov. 29, 2012

(30) Foreign Application Priority Data

May 24, 2011    (JP) .................... 2011-116150

(51) Int. Cl.
*B60W 10/00* (2006.01)
(52) U.S. Cl.
USPC ............................................. 477/77; 477/166
(58) Field of Classification Search
USPC ............. 477/70, 73, 77, 79, 80, 84, 90, 91, 477/115, 166, 175; 74/330, 335, 336 R
See application file for complete search history.

(56) References Cited

U.S. PATENT DOCUMENTS

| | | | | |
|---|---|---|---|---|
| 6,869,382 | B2 * | 3/2005 | Leising et al. | 477/77 |
| 8,272,994 | B2 * | 9/2012 | Nedachi et al. | 477/175 |
| 2003/0119629 | A1 * | 6/2003 | Kuhstrebe | 477/77 |
| 2007/0199397 | A1 * | 8/2007 | Maten et al. | 74/340 |
| 2008/0236317 | A1 * | 10/2008 | Matsushita et al. | 74/340 |
| 2009/0137364 | A1 * | 5/2009 | Honma | 477/175 |

FOREIGN PATENT DOCUMENTS

JP    2009-97648 A    5/2009

* cited by examiner

*Primary Examiner* — Justin Holmes
(74) *Attorney, Agent, or Firm* — Rothwell, Figg, Ernst & Manbeck, P.C.

(57) ABSTRACT

When reception of engine rotating speed information from an engine control unit is failed, the control unit puts gear positions belonging to a second gear position group in a nonoperable and connected state, and then puts a second clutch into a engaged state to convert a rotating speed of a second input shaft detected by a second rotational sensor into a rotating speed of an engine output shaft. The control unit controls so as to fasten a first clutch based on the converted rotating speed of the engine output shaft, thereby enabling a star of a vehicle.

8 Claims, 7 Drawing Sheets

CONTROL APPARATUS FOR TWIN-CLUTCH AUTOMATIC TRANSMISSION

CROSS-REFERENCE

This document claims priority to Japanese Application Number 2011-116150, filed May 24, 2011, the entire content of which is hereby incorporated by reference.

FIELD OF THE INVENTION

The present invention relates to a control apparatus for an automatic transmission communicating with a control unit of an internal-combustion engine to which the automatic transmission for a vehicle is connected. In particular, the present invention relates to a control apparatus for a twin-clutch automatic transmission in which multiple gear positions are divided into two gear position groups, and which is equipped with a first clutch for selecting a gear position in one gear position group, and a second clutch for selecting a gear position in the other gear position group.

BACKGROUND ART

Conventionally, there has been heretofore known a twin-clutch automatic transmission in which multiple gear positions are divided into two gear position groups (odd gear position group and even gear position group), and which is equipped with a first clutch mechanism for selecting a gear position in one gear position group and a second clutch mechanism for selecting a gear position in the other gear position group (e.g., see JP 2009-97648 A). The twin-clutch automatic transmission of this kind is configured such that the other clutch mechanism is put into a disengaged state, while selecting the gear position in the gear position group corresponding to the one clutch mechanism, with the other clutch mechanism engaging. At this time, a gear drive system associated with the gear position corresponding to the other clutch mechanism is in a neutral condition where power is not transmitted. The twin-clutch mechanism is arranged to allow power transmission, through such an operation, with the prescribed gear position selected. The twin-clutch automatic transmission is configured to couple a first input shaft and an engine output shaft together by engaging the first clutch mechanism. Like this, twin-clutch automatic transmission is configured to couple the second input shaft and the engine output shaft together by engaging the second clutch mechanism. The first input shaft or the second input shaft is arranged to transmit a rotation via each driven gear to the output shaft of the twin-clutch automatic transmission.

An Engine Control Unit (ECU) is connected to an engine to be coupled with the twin-clutch automatic transmission of this sort. Moreover, a Transmission Control Unit (TCU) is also connected to the twin-clutch automatic transmission. The ECU is configured to receive a signal indicative of rotating speed information from an engine speed sensor which detects a engine speed, and a signal indicative of accelerator opening information and brake switch information, etc. By doing so, various decisions are done for engine control. The TCU is configured to receive signals from a first input shaft rotational sensor, a second input shaft rotational sensor, an output shaft rotational sensor, and a shift lever switch. Hereupon, the first input shaft rotational sensor is for detecting a rotating speed of the first input shaft, the second input shaft rotational sensor is for detecting a rotating speed of the second input shaft, and the output shaft rotational sensor is for detecting a rotating speed of an output shaft of the twin-clutch automatic transmission, respectively. The TCU is configured to do various decisions for outputting a control signal to a shift-clutch actuator. Between the ECU and the TCU, communication is made via bidirectional Controller Area Network (CAN) communication.

As a representative of clutch torque capacity regulation executed in a control apparatus for the twin-clutch automatic transmission on starting a vehicle, an approach is well known to control slip quantity of an engine speed and a clutch speed. In this approach, the torque capacity of the clutch is regulated such that a target engine speed is determined from at least accelerator opening to achieve the target engine rotation. Usually, it is the custom to do clutch torque capacity regulation by synthesizing feed-forward control in response to torque to be input and feedback control in response to a deviation between the target engine speed and an actual engine speed. However, this approach is problematic that a too much feed-forward controlled variable can cause an engine stall due to factors, including engine torque accuracy, feasibility of torque clutch capacity, variations in response lag, and environmental changes such as temperature. Under these circumstances, it is often the case that the feedback control is sometimes regarded as more important than the others.

Prior Art Document

Patent Document

SUMMARY OF THE INVENTION

Problem to be Solved

Since the feedback control is a control technique in response to the deviation between the target engine speed and the actual engine speed, as mentioned above, reception of the engine speed information is indispensable as a general rule. The engine speed is received via the CAN communication from the ECU. Thus, in the event of disconnection of a CAN communication line, it falls into a situation where the TCU fails to receive the engine speed information. Hence, even granted that the engine can be operated as usual while the CAN communication line is disconnected, the TCU is allowed only to perform the feed-forward control. In this situation, it could not be denied that it is prone to rev up engine revolutions, with the inability to start a vehicle. For the purpose of preventing such an undesirable event, it may hit on an idea of taking measures of directly receiving a signal from the engine speed sensor and of taking a dual system with the CAN information for striving for a redundant configuration of the system. However, a problem emerges that such measures will invite higher cost.

Further, in such twin-clutch automatic transmission, the transmission is equipped with plural rotational speed sensors deemed to be necessary from a functional point of view. It is possible to say that improving an operating rate of the equipped parts is desirable utilizing these rotational speed sensors, from the point of view of building an efficient control system.

The present invention is made focusing on the above-identified problems potentially imminent in the prior art, and its objective is to provide a control unit of a twin-clutch automatic transmission which enables a start of a vehicle in the absence of parameter information to be received via communication between control units, and is able to build a fault tolerant control system, independent of control of a dual system.

Solution to the Problem

To solve the above-identified problem, according to one aspect of the present invention, the invention provides a control apparatus for a twin-clutch automatic transmission to be connected to the twin-clutch automatic transmission, wherein the twin-clutch automatic transmission has a plurality of gear positions which are divided into a first gear position group and a second gear position group, and are operatively and connectably coupled with an engine output shaft of an internal-combustion engine, the twin-clutch automatic transmission comprises a first input shaft for the gear positions belonging to the first gear position group; a first clutch mechanism for connecting the first input shaft to the engine output shaft; a first rotating speed detector for detecting a rotating speed of the first input shaft; a second input shaft for the gear positions belonging to the second gear position group; a second clutch mechanism for connecting the second input shaft to the engine output shaft; and a second rotating speed detector for detecting a rotating speed of the second input shaft, the control apparatus is communicable with an internal-combustion engine control unit to which rotating speed information on the engine output shaft of the internal-combustion engine is input, the control apparatus controls to fasten the first clutch mechanism for a start of a vehicle, based on the rotating speed information received from the internal-combustion engine control unit, when reception of the rotating speed information from the internal-combustion engine control unit is not succeeded, the control apparatus puts the gear positions belonging to the second gear position group into a disengaged state, and then puts the second clutch mechanism into a engaged state, and converts a rotating speed of the second input shaft detected by the second rotating speed detector into to a rotating speed of the engine output shaft, and the control apparatus controls to fasten the first clutch mechanism based on the converted rotating speed of the engine output shaft.

Further, as the aforesaid aspect, when reception of the rotating speed information from the internal-combustion control unit is failed, the control apparatus calculates abnormal state clutch torque to fasten the first clutch mechanism by synthesizing abnormal state feed-forward control torque set independent of actual torque of the internal-combustion engine and abnormal state feedback control torque calculated based on a deviation between a target rotating speed of the internal-combustion engine and the converted rotating speed of the engine output shaft.

Further, as the aforesaid aspect, when reception of the rotating speed information from the internal-combustion engine control unit is failed, the control apparatus converts the rotating speed detected by the first rotating speed detector concerning rotation of the first input shaft following the first clutch mechanism in a engaged state into the rotating speed of the engine output shaft, and then controls engaging of the second clutch mechanism for continuous driving so as to implement the engaging based on the converted rotating speed of the engine output shaft, and the control apparatus converts the rotating speed detected by the second rotating speed detector concerning rotation of the second input shaft following the second clutch mechanism in a engaged state into the rotating speed of the engine output shaft, and then controls engaging of the first clutch mechanism for continuous driving so as to implement the engaging based on the converted rotating speed of the engine output shaft.

Advantageous Effect of the Invention

According to the present invention, the invention realizes the control apparatus for the twin-clutch automatic transmission which enables a start of the vehicle, even when reception of parameter information via communication between the internal-combustion engine control unit and the control apparatus is failed, minimum driving e.g., retreat running, and, building of the fault tolerant control system, independent of the dual system.

DESCRIPTION OF EMBODIMENTS

Hereinafter, a description will be made to the details of a control apparatus for a twin-clutch automatic transmission according to an embodiment of the present invention with reference to the accompanying drawings.

Figure 1:
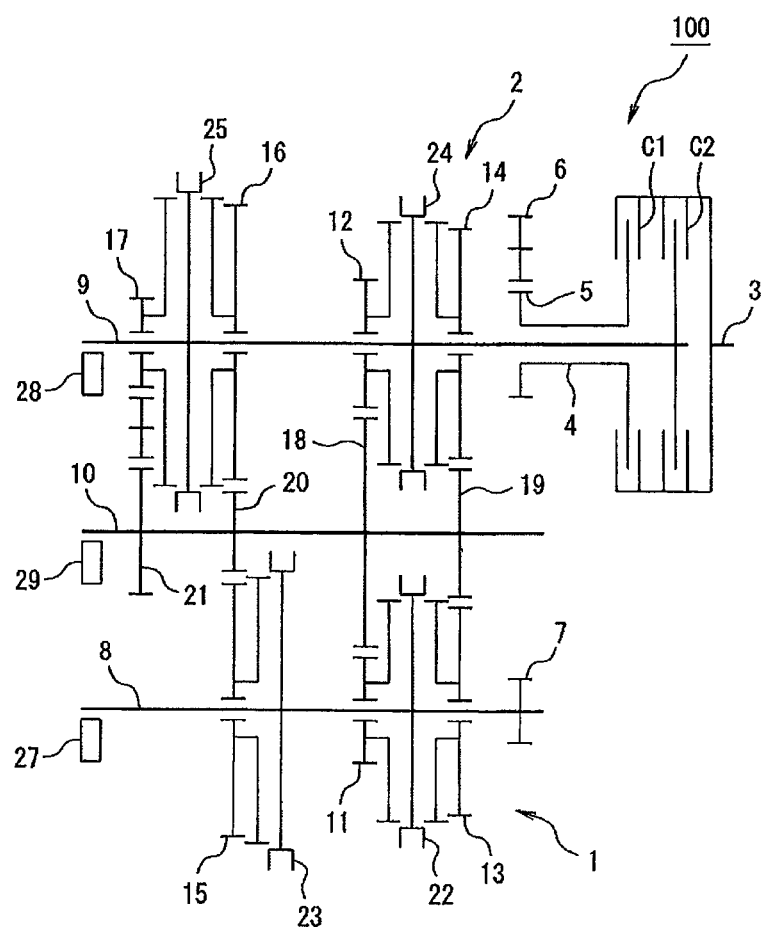
FIG. 1 is a skeleton diagram showing a twin-clutch automatic transmission to which a control apparatus for a twin-clutch automatic transmission according to an embodiment of the present invention is applied.

Firstly, an explanation will be made to the twin-clutch automatic transmission 100 to be used for in the present embodiment, referring to a skeleton diagrams shown in FIG. 1. As shown in FIG. 1, the twin-clutch automatic transmission 100 is provided with a plurality of gear positions synthesizing a first gear position group (odd gear position group) 1 and a second gear position group (even gear position group) 2. Further, the twin-clutch automatic transmission 100 is provided with a first clutch C1, as a first clutch mechanism, for selecting a gear position belonging to the first gear position group 1, and a second clutch C2, as a second clutch mechanism, for selecting a gear position belonging to the second gear position group 2.

While engaging one clutch out of the first clutch C1 and the second clutch C2, and selecting a prescribed gear position in the corresponding gear position group, the other clutch is put into a disengaged state. At the same time, a corresponding gear transmission system is put into a neutral condition where power is not transmitted, thus capacitating the transmitter 100 to do power transmission in a condition where the prescribed gear position is selected.

As shown in FIG. 1, the first clutch C1 and the second clutch C2 are coupled to an engine output shaft 3, as an engine output shaft, of the internal-combustion engine. An output from the first clutch C1 is coupled to a hollow input shaft 4, and transmitted via respective gears 5, 6, and 7 to the first input shaft 8. In the meanwhile, an output from the second clutch C2 is connected to the second input shaft 9.

The first input shaft 8 is provided with a first-speed drive gear 11, a third-speed drive gear 13, and a fifth-speed drive gear 15. Meanwhile, the second input shaft 9 is provided with a second-speed drive gear 12, a fourth-speed drive gear 14, a sixth-speed drive gear 16, and a reverse drive gear 17.

The twin-clutch automatic transmission 100 includes a transmission output shaft 10. The transmission output shaft 10 is provided with a first-second-speed driven gear 18, a third-fourth-speed driven gear 19, a fifth-sixth-speed driven gear 20, and a reverse driven gear 21.

The first input shaft 8 is provided with a first-third-speed synchronous mechanism 22 for switching among a neutral position, a first-speed gear drive gear selecting position, and a third-speed gear drive gear selecting position, and a fifth-speed synchronous mechanism 23 for switching between a neutral position and a fifth-speed drive gear selecting position. Meanwhile, the second input shaft 9 is provided with a second-fourth-speed synchronous mechanism 24 for switching among a neutral position, a second-speed gear drive gear selecting position, and a fourth-speed drive gear selecting position, and a sixth-R-speed synchronous mechanism 25 for changing among a neutral position, a six-speed drive gear selecting position, and a reverse drive gear selecting position.

Figure 2:
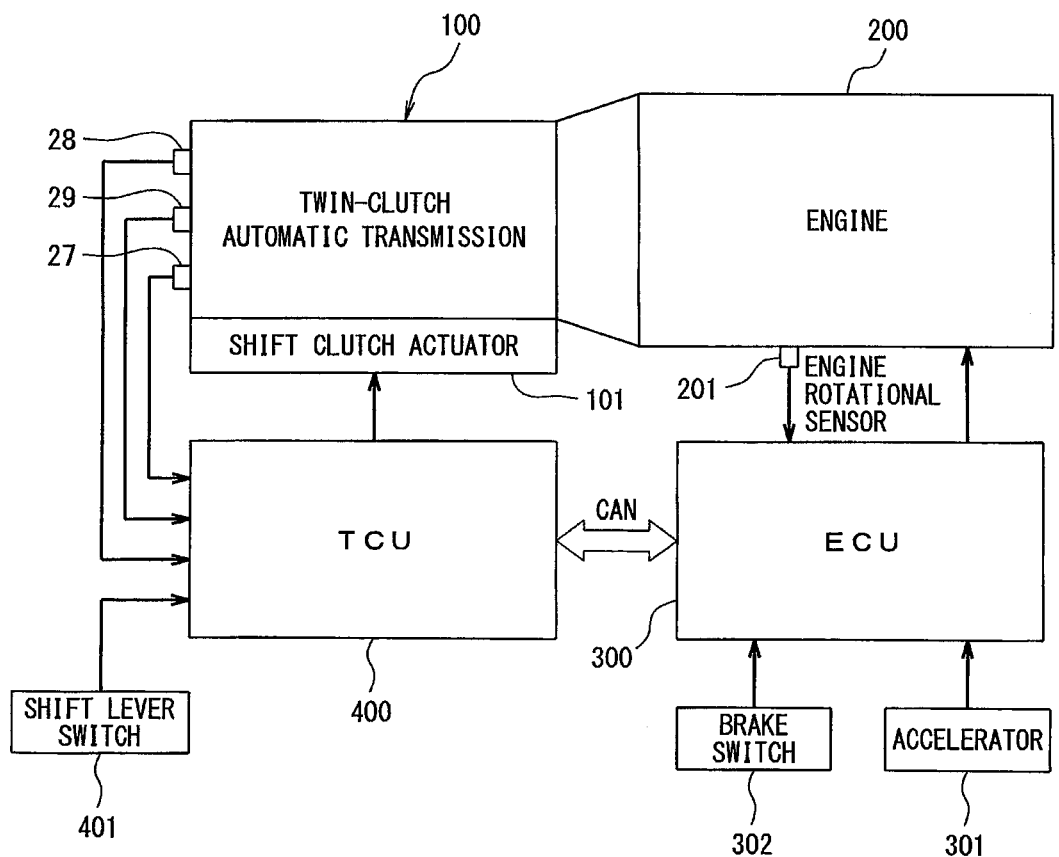
FIG. 2 is a block diagram showing a configuration including a control apparatus for a twin-clutch automatic transmission according to an embodiment of the present invention.

The twin-clutch automatic transmission 100 is provided with a shift-clutch actuator 101 for actuating these synchronous mechanisms 22, 23, 24 and 25, and the first clutch C1 and the second clutch C2 (see FIG. 2). In this connection, a final gear (not shown) is provided in the transmission output shaft 10 to transmit power to a driving wheel (not shown).

The twin-clutch automatic transmission 100 is provided with a first rotational sensor 27, as a first rotating speed detector, for detecting a rotating speed of the first input shaft 8, a second rotational sensor 28, as a second rotating speed detector, for detecting a rotating speed of the second input shaft 9, and a third rotational sensor 29, as a third rotating speed detector, for detecting a rotating speed of the transmission output shaft 10.

An explanation will then be made to a configuration of a Transmission Control Unit (hereafter referred to merely as TCU) 400 for the twin-clutch automatic transmission according to the present embodiment, referring to a control system block diagram shown in FIG. 2. As shown in FIG. 2, an engine 200 is coupled with the twin-clutch automatic transmission 100. In passing, the engine output shaft 3 is coupled with the clutches C1, C2, as mentioned above. Further, the engine 200 is provided with an engine speed sensor 201 for detecting an engine speed.

As shown in FIG. 2, an Engine Control Unit (hereinafter, referred to merely as ECU) 300, as an internal-combustion engine control unit, is connected to the engine 200. The above engine speed sensor 201, an accelerator 301, and a brake switch 302 are connected to the engine 200 to make various decisions for control of the engine 200.

The TCU 400, as a control unit, is connected to a shift-clutch actuator 101 of the twin-clutch automatic transmission 100. As shown in FIG. 2, a shift lever switch 401 is connected to the TCU 400 to receive switching positional information of the shift lever. Moreover, the aforesaid first rotational sensor 27, the second rotational sensor 28, and the third rotational sensor 29 are connected to the TCU 400 to receive a data signal representative of a rotating speed of the first input shaft 8, a rotating speed of the second input shaft 9, and a rotating speed of the transmission output shaft 10, respectively.

Further, the ECU 300 and the TCU 400 are configured to be connected in a transmittable and receivable manner via CAN communication for allowing communication there between. The TCU 400 is configured to do various determinations based on information of these data signals via the shift lever switch 401, the first rotational sensor 27, the second rotational sensor 28, the third rotational sensor 29 and the CAN communication, and to output a control signal to the shift-clutch actuator 101.

Then, an explanation will be made to an operation of the twin-clutch automatic transmission 100. As shown in FIG. 2, the TCU 400 selects a gear position, suited for a current driving condition, from values detected by the shift lever switch 401, the first rotational sensor 27, the second rotational sensor 28, the third rotational sensor 29, and the accelerator opening, the engine speed, and the brake switch information, etc. sent from ECU 300 via the CAN communication, and actuates the shift-clutch actuator 101 in such a manner as to implement this gear position.

The shift-clutch actuator 101 is connected to a shifting fork (not shown) and the shifting fork is configured to fit to sleeves provided in the first-third-speed synchronous mechanism 22, the fifth-speed synchronous mechanism 23, the second-fourth-speed synchronous mechanism 24, and the sixth-R-speed synchronous mechanism 25. The shifting fork is configured to move by actuating the shift-clutch actuator 101, and to shift to a gear position selected by these synchronous mechanisms 22 to 25. The shift-clutch actuator 101 is actuated to fasten to one clutch out of the first clutch C1 and the second clutch C2 belonging to the selected gear position groups (first gear position group 1 and second gear position group 2), and to release the other clutch. This transmits driving power output from the engine 200.

Where the shift lever switch 401 is in a neutral condition, the first clutch C1 and the second clutch C2 are both released, and all the synchronous mechanisms 22 to 25 are controlled to come to a neutral position. Where a driver changes a shift lever to a drive range, the first clutch C1 and the second clutch C2 are both held in a released state, and the shift-clutch actuator 101 is actuated in order for the first-third-speed synchronous mechanism 22 to shift to the first-speed selecting position. After the change of the first-third-speed synchronous mechanism 22 is completed, the system detects a driver's intention of what for a vehicle is started from the brake switch information of the brake switch 302 and the accelerator opening information of the accelerator to regulate torque capacity of the first clutch C1 by means of the shift-clutch actuator 101 for a smooth start of the vehicle.

What is used for clutch torque capacity regulation on starting the vehicle is a technique of controlling slip quantity of the engine speed and the clutch rotating speed. The technique introduced here determines a target engine speed, based on previously prepared results, inherent to the vehicle indicating a relationship between the accelerator opening and the target engine speed, as shown e.g., in FIG. 3, at least from the accelerator opening, and regulates torque capacity of the first clutch C1 so as to achieve the target engine speed. Typically, it is the custom to perform clutch torque capacity regulation, by synthesizing feed-forward control in response to torque to be input, and feedback control in response to a deviation between the target engine speed and an actual engine speed. However, it is liable that a too much feed-forward controlled variable can cause an engine stall due to factors, including engine torque accuracy, feasibility of torque capacity, variations in response lag, and environmental changes such as temperature. Under these circumstances, it is often the case that the feedback control is sometimes regarded as more important than feed-forward control.

As stated above, since the feedback control is a control mode in response to the deviation between the target engine speed and the actual engine speed, reception of the engine speed information is indispensable. Usually, because the engine speed information is information to be received via the CAN communication from the ECU 300, once disconnection of a CAN communication line is occurred, for any reason, the TCU 400 falls into a situation where the TCU 400 is unable to receive information from the ECU 300.

In the present embodiment, in case of failure to receive the engine speed information by the TCU 400 e.g., due to disconnection of the CAN communication line, TCU 400 fastens the second clutch C2, after the second-fourth-speed synchronous mechanism 24 and the sixth-R-speed synchronous mechanism 25 are both shifted to a neutral position to receive the engine speed information by the second rotational sensor 28. In this way, the TCU 400 is one intended to receive the engine speed information from the second rotational sensor 28 for allowing control of the first clutch C1 on a start of the vehicle. In this way, as long as the second-fourth-speed synchronous mechanism 24 and the sixth-R-speed synchronous mechanism 25 are both in the neutral position, power will not be transmitted even though the second clutch C2 is engaged. As a rotating speed of the second input shaft 9 coincides with the engine speed because of the engaging of the second clutch C2, it becomes possible to receive the engine speed information from a value detected by the second rotational sensor 28.

Figure 4:
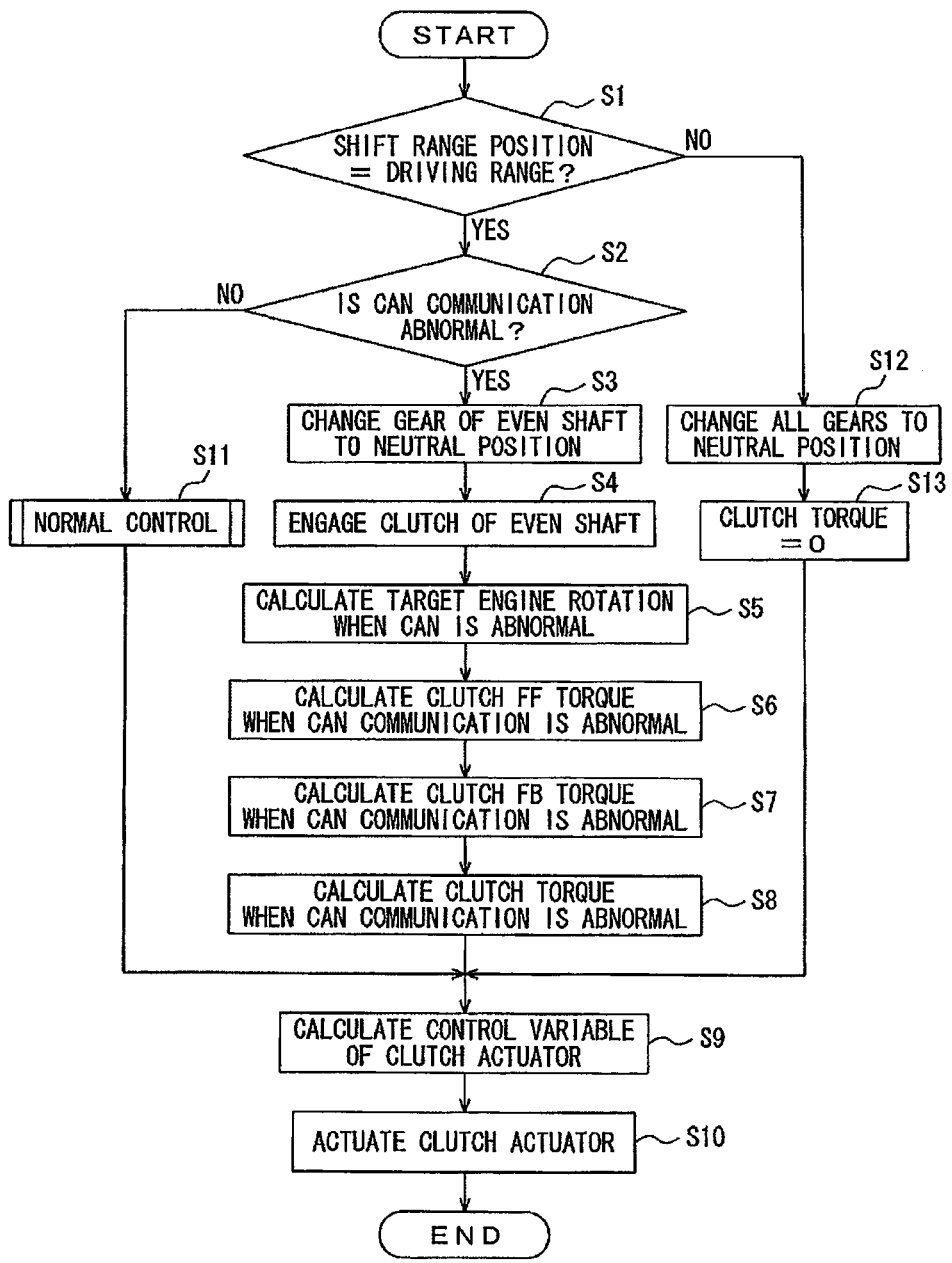
FIG. 4 is a flow chart showing a flow of control on starting a vehicle.

An explanation will next be made to control by the control apparatus for the twin-clutch automatic transmission according to the present embodiment referring to FIG. 4. FIG. 4 is a flow chart showing control executed by the control apparatus for the twin-clutch automatic transmission on starting the vehicle.

Initially, it is determined whether a shift range position detected by the shift lever switch 401 is within a driving range (step S1). Here, the driving range signifies a forward driving range and a backward driving range.

In step S1, if it is determined not to be within the driving range, all the synchronous mechanisms 22 to 25 are shifted to the neutral position (step S12), and clutch torque is in turn set to 0 (step S13).

Next, a control value of the clutch actuator in the shift-clutch actuator 101 is calculated (step S9). In this connection, as a clutch actuator, a solenoid of oil pressure control valve may e.g., be available. In this case, a current value to be flown to the hydraulic solenoid is calculated based on the clutch torque. Control can be made to actuate the clutch by applying the current value thus calculated as above to the hydraulic solenoid (step S10).

In step S1, if it is determined that the shift range position is within the driving range, then it is determined whether the CAN communication is in an abnormal state due to disconnection (step S2). Herein, whether the CAN communication is in the abnormal state can be determined relying upon whether there exists a case where communication from the ECU 300 is unable to receive over a predetermined period of time, or a case where transmission notifying that the engine rotation information of the ECU 300 is invalid is received. In step S2, if it is determined that the CAN communication is normal, then the process proceeds to step S11 where control of a normal state control step is executed by the TCU 400.

Figure 5:
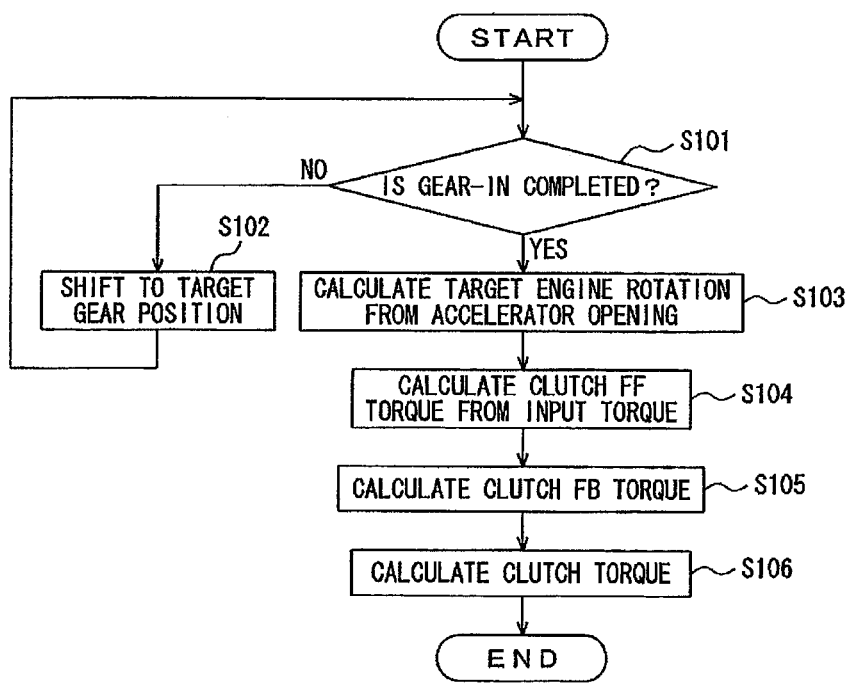
FIG. 5 is a flow chart showing a flow of control by a control unit according to the present embodiment.

An explanation will be made here to control in a normal condition to be executed in step S11 referring to a flow chart shown in FIG. 5. Firstly, it is determined in step S101 that a gear-in of a gear position (normally, first-speed) to be used on starting the vehicle is already completed. It should be noted that whether the gear-in is completed can be determined e.g., by providing a sensor for detecting a moving position of a shifting fork (not shown) and a position of the shifting fork is in a gear-in position. If it is determined in step S101 that the gear-in is not yet completed, then the process proceeds to step S102 where control will be done so as to change to a target gear position.

Figure 3:
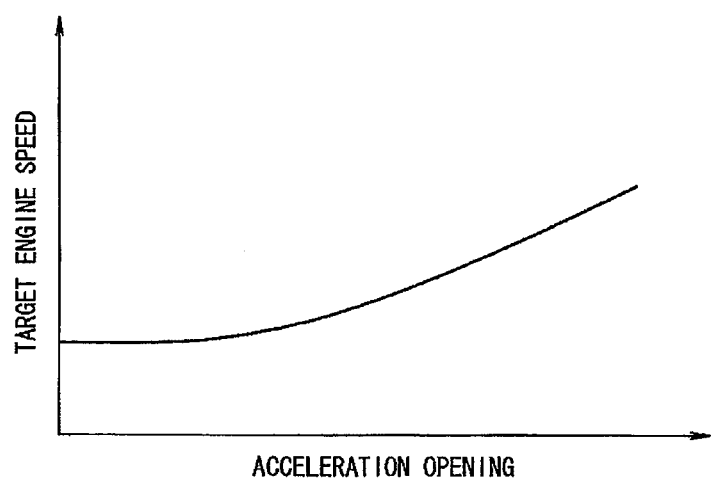
FIG. 3 is a graph showing a relationship between accelerator opening and a target engine speed.

If it is determined in step S101 that the gear-in is already completed, then a target engine speed is calculated based on the accelerator opening(step S103),In passing, the target engine speed is determined e.g., from a relationship between the accelerator opening and the target engine speed, as shown in FIG. 3.

In step S104, clutch feed-forward control torque (i.e., FF clutch torque) is calculated from input torque. In this instance, the clutch feed-forward control torque is calculated e.g., by multiplying a given factor and the input torque together, within the limits where there is no fear of occurring an engine stall, incidental to an increased feed-forward control variable, due to factors, including engine torque accuracy, feasibility of torque clutch capacity, variations in response lag, and environmental changes such as temperature.

Then, in step S105, the clutch feedback control torque (i.e., FB clutch torque) is calculated. The clutch feedback control torque is torque which is calculated by (Proportional/Integral) PI control based e.g., on the deviation between the target engine speed and the actual engine speed.

Subsequently, in step S106, the clutch torque is calculated by synthesizing the clutch feed-forward control torque and the clutch feedback control torque. Incidentally, after step S106, the aforesaid process in steps S9, S10, shown in FIG. 4, will be performed.

Figure 6:
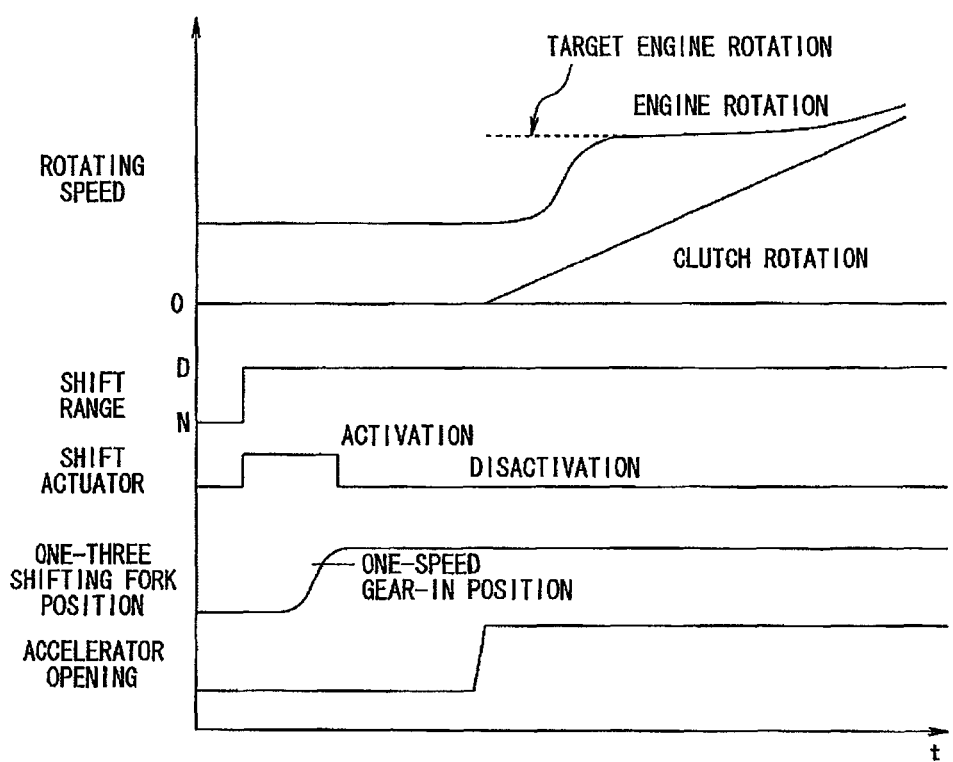
FIG. 6 is a timing chart in a normal condition on starting a vehicle.

FIG. 6 is a timing chart where the CAN communication is in the normal condition on starting the vehicle. As shown in FIG. 6, when the shift range is changed from a neutral (N) range to a drive (D) range, the shift actuator in the shift clutch actuator 101 is first actuated, and then the first-third-speed synchronous mechanism 22 is shifted from the neutral position to the first-speed gear-in position. By a first-third-speed shifting fork positional sensor (not shown), and then the shift actuator is deactivated. Thereafter, when the accelerator is pressed, a target engine speed is set in accordance with the accelerator opening, and the clutch torque is controlled so that the actual engine speed runs up to the target engine speed, thus starting the vehicle.

An explanation will next be made to a flow of control executed in an abnormal state control step governed by the TCU 400 when the CAN communication is in the abnormal state, returning again back to FIG. 4.

As shown in FIG. 4, if it is determined in step S2 that the CAN communication is in the abnormal state, the process proceeds to step S3 where all gears of the even shaft are shifted to the neutral position. Then, in step S4, the second clutch C2 that is an even clutch is engaged. After that, in step S5, a target engine speed is calculated when a CAN communication error is occurred. Because when the CAN communication is disconnected, reception of the accelerator opening information from the ECU300 fails, calculation is made, in such an eventuality, by assuming the accelerator opening to be a fixed value, in spite of the accelerator opening.

Subsequently, in step S6, the clutch feed-forward control torque (CAN abnormal state FF clutch torque) is calculated when the CAN communication is in the abnormal state. Likewise, because when the CAN communication is in the abnormal state, the engine torque information also cannot be received from the ECU300, calculation is made, in such an eventuality, by assuming the engine torque to be a fixed value, in spite of the engine torque.

Then, in step S7, the clutch feedback control torque (CAN abnormal state FB clutch torque) is calculated when the CAN communication is in the abnormal state. In this case, as with the normal condition, calculation is made by Proportional Integral (PI) control based on the deviation between the target engine speed and the actual engine speed (i.e. , second input shaft rotating speed).

Afterward, in step S8, the CAN abnormal state clutch torque is calculated as the sum of the CAN abnormal state FF clutch torque and the CAN abnormal state FB clutch torque. Subsequent processes are executed in step S9 and step S10, as stated above.

Figure 7:
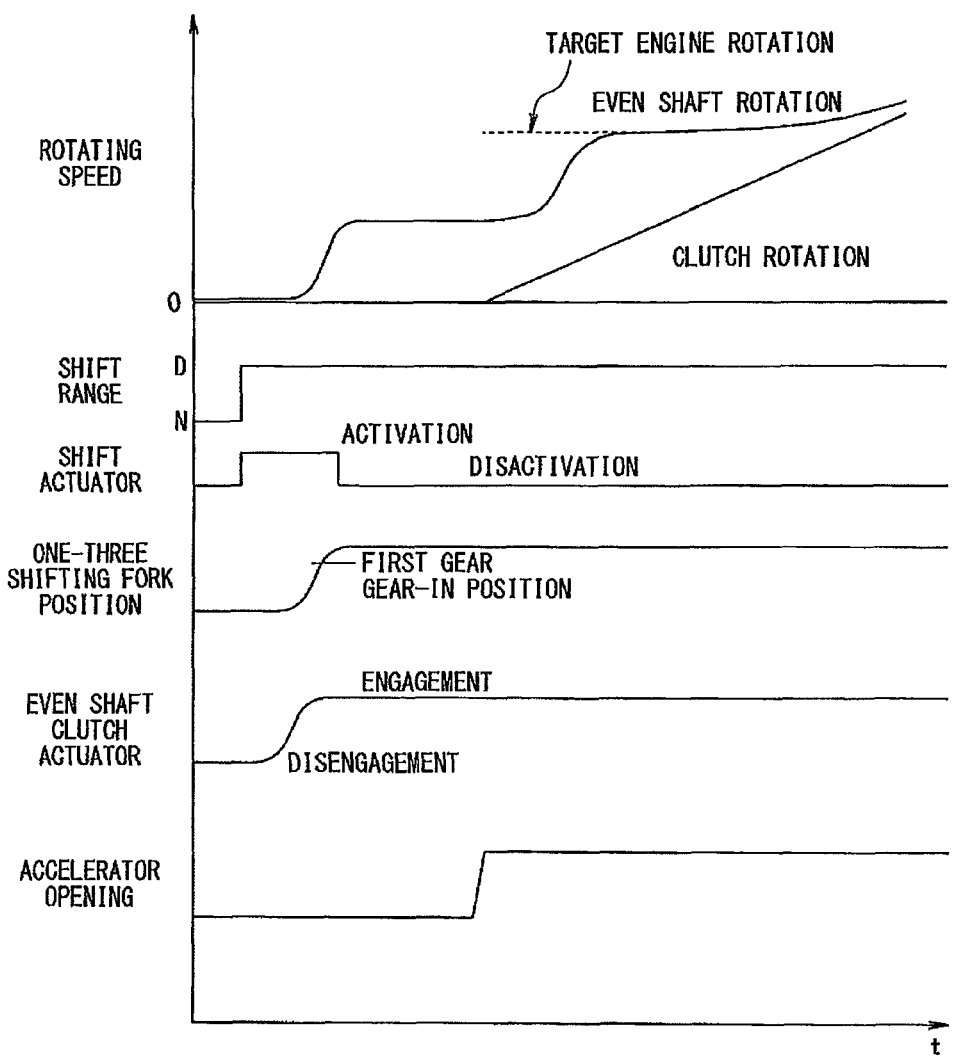
FIG. 7 is a timing chart in a CAN abnormal state on starting a vehicle.

FIG. 7 is a timing chart when the CAN communication is in the abnormal state on starting the vehicle. As shown in FIG. 7, it is similar, as with the normal condition, in that the first gear-in is done after the shift range is changed from the neutral (N) range to the drive (D) range. In case of abnormal state of the CAN communication, the even clutch actuator is actuated in parallel with this, and the second clutch C2 is engaged. Hereupon, a process to change a gear of the even shaft to the neutral position is omitted. This is because the shift range is originally N, and thus all the gears are changed to the neutral position in neutral. Once the second clutch C2 is engaged, rotation of the second input shaft 9 runs up from 0 until it matches with the engine speed. Afterward, the clutch torque capacity is regulated, as with the normal condition, so as to run up to the target engine speed, which enables a start of the vehicle.

As can be seen from the foregoing descriptions, with the control apparatus for the twin-clutch automatic transmission according to the present embodiment, the apparatus allows a start of the vehicle, even in situations where reception of the engine rotation information from the ECU 300 is failed.

Further, in the control apparatus for the twin-clutch automatic transmission according to the present embodiment, one could imagine circumstances where when a driver presses the accelerator to take the engine to full power and a throttle is opened to full throttle, it would eventuate in precluding a smooth start of the vehicle. Nonetheless, in the present embodiment, there is provided one, in addition to the aforesaid arrangement, allowing detection of the occurrence of abnormal state, even at the ECU 300 side, where it will be impossible to do the ECU communication. Hence, the apparatus may implement a smoother start of the vehicle, in the situation by controlling an electric throttle at the ECU 300 side, so as not to generate torque exceeding a predetermined one, regardless of the accelerator opening.

It should be noted that as for a case where the CAN communication becomes abnormal, either the clutch C1 or the clutch C2 is being engaged during traveling, and it satisfies inequality of rotating speed of the shaft in engaging=engine speed. Therefore, substituting the rotating speed of the shaft in engaging for the engine speed allows continuous driving of the vehicle. A clutch change in the first clutch C1 and the second clutch C2 in gear shifting is possible by performing feed-forward control of the each clutch, admitting that it leads to a deteriorated gear shift shock. That is, in the present embodiment, it enables gear shift of shift up and shift down, which allows, to some extent, long distance travelling and speed-up traveling. Accordingly, it enables retreat running and vehicle movement to a service facility, even when the CAN communication is failed.

In the control apparatus for the twin-clutch automatic transmission according to the present embodiment, the transmission is configured to take an arrangement where redundancy is avoided, such as to be a dual system with the CAN information, without directly inputting a signal from the engine rotational sensor to the TCU 400. This eliminates a possibility of becoming higher cost. In the present embodiment, notwithstanding, the twin-clutch automatic transmission 100 is provided with a plurality of rotational sensors 27, 28 deemed to be indispensable, from the functional perspective, they are instrumental to raise an operating ratio of parts equipped therein by taking advantage of these sensors, which builds an efficient control system.

In the control apparatus for the twin-clutch automatic transmission according to the present embodiment, the apparatus enables a start of the vehicle, even when reception of the parameter information via the CAN communication between control units (ECU 300 and TCU 400) is failed. This allows building of a fault tolerant control system for communicating information there between, independent of the dual system.

While in the above, the descriptions are made of the embodiment of the present invention, it should not be construed that the statements and the drawings that form part of the disclosures of the present embodiment are ones made with the intention of limiting the present invention. It would have been obvious to a person skilled in the art, from the above disclosures, to contrive a variety of alternative embodiments, examples, and operation technologies.

For example, whereas in the forgoing present embodiment, the descriptions are made by giving an example where communications to communicate information between the control units are conducted via the CAN communication, not necessarily limited thereto, another system may, of course, be adopted in which various in-vehicle LANs are installed, except for the CAN communication.

REFERENCE SIGNS LIST

C1: first clutch
C2: second clutch
1: first gear position group
2: second gear position group
3: engine output shaft
8: first input shaft
9: second input shaft
10: transmission output shaft
22: first-third-speed synchronous mechanism
23: fifth-speed synchronous mechanism
24: second-fourth-speed synchronous mechanism
25: sixth-R-speed synchronous mechanism
27: first rotational sensor (first rotating speed detector)
28: second rotational sensor (second rotating speed detector)
29: third rotational sensor
100: twin-clutch automatic transmission
101: shift-clutch actuator
200: engine (internal-combustion engine)
201: engine rotational sensor
300: engine control unit (ECU)
301: accelerator
302: brake switch
400: transmission control unit (TCU)
401: shift lever switch

The invention claimed is:

1. A control apparatus for a twin-clutch automatic transmission to be connected to the twin-clutch automatic transmission;
wherein the twin-clutch automatic transmission has a plurality of gear positions which are divided into a first gear position group and a second gear position group, and which are operatively and are connectably coupled with an engine output shaft of an internal-combustion engine;
the twin-clutch automatic transmission comprises a first input shaft for the gear positions belonging to the first gear position group; a first clutch mechanism for connecting the first input shaft to the engine output shaft; a first rotating speed detector for detecting a rotating speed of the first input shaft; a second input shaft for the gear positions belonging to the second gear position group; a second clutch mechanism for connecting the second input shaft to the engine output shaft; and a second rotating speed detector for detecting a rotating speed of the second input shaft;

the control apparatus is communicable with an internal-combustion engine control unit to which rotating speed information on the engine output shaft of the internal-combustion engine is input;

the control apparatus controls to engage the first clutch mechanism for a start of a vehicle, based on the rotating speed information received from the internal-combustion engine control unit;

when reception of the rotating speed information from the internal-combustion engine control unit is failed, the control apparatus puts the gear positions belonging to the second gear position group into a disengaged state, and then puts the second clutch mechanism into a engaged state, and converts a rotating speed of the second input shaft detected by the second rotating speed detector into to a rotating speed of the engine output shaft;

the control apparatus controls to fasten the first clutch mechanism based on the converted rotating speed of the engine output shaft; and wherein when reception of the rotating speed information from the internal-combustion control unit is failed, the control apparatus calculates abnormal state clutch torque to fasten the first clutch mechanism by a combination of abnormal state feed-forward control torque independent of actual torque of the internal-combustion engine and abnormal state feedback control torque calculated based on a deviation between a target rotating speed of the internal-combustion engine and the converted rotating speed of the engine output shaft.

2. The control apparatus for the twin-clutch automatic transmission according to claim 1, wherein when reception of the rotating speed information from the internal-combustion control unit is failed, a value of engine torque is set to a fixed value.

3. The control apparatus for the twin-clutch automatic transmission according to claim 1, wherein when reception of the rotating speed information from the internal-combustion control unit is failed, a value of accelerator opening is set to a fixed value.

4. The control apparatus for the twin-clutch automatic transmission according to claim 1, wherein when reception of the rotating speed information from the internal-combustion control unit is failed, a value of engine torque is set to a fixed value and a value of accelerator opening is set to a fixed value.

5. A control apparatus for a twin-clutch automatic transmission to be connected to the twin-clutch automatic transmission;

wherein the twin-clutch automatic transmission has a plurality of gear positions which are divided into a first gear position group and a second gear position group, and which are operatively and are connectably coupled with an engine output shaft of an internal-combustion engine;

the twin-clutch automatic transmission comprises a first input shaft for the gear positions belonging to the first gear position group; a first clutch mechanism for connecting the first input shaft to the engine output shaft; a first rotating speed detector for detecting a rotating speed of the first input shaft; a second input shaft for the gear positions belonging to the second gear position group; a second clutch mechanism for connecting the second input shaft to the engine output shaft; and a second rotating speed detector for detecting a rotating speed of the second input shaft;

the control apparatus is communicable with an internal-combustion engine control unit to which rotating speed information on the engine output shaft of the internal-combustion engine is input;

the control apparatus controls to engage the first clutch mechanism for a start of a vehicle, based on the rotating speed information received from the internal-combustion engine control unit;

when reception of the rotating speed information from the internal-combustion engine control unit is failed, the control apparatus puts the gear positions belonging to the second gear position group into a disengaged state, and then puts the second clutch mechanism into a engaged state, and converts a rotating speed of the second input shaft detected by the second rotating speed detector into to a rotating speed of the engine output shaft;

the control apparatus controls to fasten the first clutch mechanism based on the converted rotating speed of the engine output shaft;

wherein when reception of the rotating speed information from the internal-combustion engine control unit is failed, the control apparatus converts the rotating speed detected by the first rotating speed detector concerning rotation of the first input shaft following the first clutch mechanism in a fastened state into the rotating speed of the engine output shaft, and then controls engaging of the second clutch mechanism for continuous driving based on the converted rotating speed of the engine output shaft, and the control apparatus converts the rotating speed detected by the second rotating speed detector concerning rotation of the second input shaft following the second clutch mechanism in a engaged state into the rotating speed of the engine output shaft, and then controls engaging of the first clutch mechanism for continuous driving based on the converted rotating speed of the engine output shaft.

6. The control apparatus for the twin-clutch automatic transmission according to claim 5, wherein when reception of the rotating speed information from the internal-combustion control unit is failed, a value of engine torque is set to a fixed value.

7. The control apparatus for the twin-clutch automatic transmission according to claim 5, wherein when reception of the rotating speed information from the internal-combustion control unit is failed, a value of accelerator opening is set to a fixed value.

8. The control apparatus for the twin-clutch automatic transmission according to claim 5, wherein when reception of the rotating speed information from the internal-combustion control unit is failed, a value of engine torque is set to a fixed value and a value of accelerator opening is set to a fixed value.

* * * * *